(12) United States Patent
Koeder et al.

(10) Patent No.: US 7,134,640 B2
(45) Date of Patent: Nov. 14, 2006

(54) VALVE FOR CONTROLLING FLUIDS

(75) Inventors: Thilo Koeder, Gerlingen (DE);
Massimiliano Ambrosi, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 11/011,380

(22) Filed: Dec. 15, 2004

(65) Prior Publication Data

US 2005/0133753 A1    Jun. 23, 2005

(30) Foreign Application Priority Data

Dec. 17, 2003   (DE)   ................ 103 59 174

(51) Int. Cl.
*F16K 31/02*    (2006.01)
(52) U.S. Cl. ................ 251/129.15; 335/299
(58) Field of Classification Search .......... 251/129.15; 335/299
See application file for complete search history.

(56) References Cited

U.S. PATENT DOCUMENTS 3,898,913 A * 8/1975 Hendrickson et al. ......... 91/31
4,961,561 A * 10/1990 Kamibayasi ................ 251/120
5,029,807 A * 7/1991 Fuchs .......................... 251/65
5,630,400 A   5/1997 Sumida et al.
6,328,065 B1  12/2001 Schmid et al.

FOREIGN PATENT DOCUMENTS

JP     2003-269643     9/2003

* cited by examiner

*Primary Examiner*—Edward K. Look
*Assistant Examiner*—John K. Fristoe, Jr.
(74) *Attorney, Agent, or Firm*—Ronald E. Greigg

(57) ABSTRACT

A valve for controlling fluids, including a housing in which an armature for actuating an actuating element is disposed, a valve insert disposed coaxially to the armature and an intermediate element disposed between the armature and the valve insert with the intermediate element having an inner diameter which is greater than an outer diameter of the armature or of the valve insert.

20 Claims, 1 Drawing Sheet

VALVE FOR CONTROLLING FLUIDS

BACKGROUND OF THE INVENTION

1. Field of the Invention

The present invention relates to a valve for controlling fluids, having an armature for actuating an actuating member of the valve and having a valve insert disposed coaxially to the armature.

2. Description of the Prior Art

Electromagnetic valves are known in various versions from the prior art. To assure the function of the valve, a plunging stage is embodied between the armature and the valve insert, so that one part can plunge at least partway into the other part. Until now, such plunging stages, of the kind shown for instance in German Patent Disclosure DE 197 33 660 A1, have been made by lathe machining to very close tolerances on the armature or the valve insert. The armature, on its face end toward the valve insert, has a protrusion of recessed outer diameter, and the valve insert has a correspondingly embodied annular edge region, so that the armature can plunge into the valve insert. Thus in the prior art, machining must be done on both the face end of the armature and the face end of the valve insert, which is complicated and expensive because of the tolerances required.

OBJECT AND SUMMARY OF THE INVENTION

The valve for controlling fluids of the invention has the advantage over the prior art that this valve is constructed very simply and can be furnished at low costs for production and assembly. Thus the effort and expense of producing the valve can be reduced considerably, and the demands in terms of the tolerances of the individual components can also be less stringent. According to the invention, this is attained by providing that an intermediate element is disposed between the armature and the valve insert. The intermediate element has an inner diameter which is greater than an outer diameter of the armature, or greater than an outer diameter of the valve insert. Whichever is the component (the armature or the valve insert) that does not have the greater outer diameter has an outer diameter which is less than the inner diameter of the intermediate element. As a result, the two components can move relative to one another, and the other component having the smaller outer diameter can plunge into the intermediate element. Thus by means of the intermediate element, the plunging stage on the valve is furnished without requiring complicated and expensive steps of machining the armature or the valve insert.

The intermediate element is preferably embodied as an annular element. As a result, the intermediate element can be furnished especially simply and economically.

Especially preferably, the intermediate element is embodied flexibly, at least to a certain extent. This can be made possible for instance by embodying the intermediate element as an annular element whose height is only slight in comparison to its diameter. For instance, the ratio of the outer diameter of the ring to its height is approximately 10:1. As a result, a certain flexibility of the ring can be furnished, so that even in certain regions, the intermediate element can continue to compensate for a radial offset between the armature and the valve insert.

Especially preferably, the intermediate element is made from a soft-magnetic material, such as iron. If a soft-magnetic material is used, it can also be assured that the course of the characteristic lines of magnetic force are smoothed accordingly, making it possible to reduce magnetic losses.

Also preferably, the intermediate element is produced by means of a stamping process, so that it can be produced especially quickly and economically.

Especially preferably, the intermediate element has a height which is equal to or greater than a stroke height of the relative motion between the armature and the valve insert. As a result, jamming of the intermediate element and the moving component can be prevented with certainty.

Preferably, the valve for controlling fluids of the invention is used in a vehicle dynamics control system, such as electronic stability control (ESP) systems, anti-lock brake systems (ABS), or traction control systems. The use of the valve of the invention is not limited to these applications, however. The valve can be used in all hydraulic and/or pneumatic systems, and in particular in vehicles.

BRIEF DESCRIPTION OF THE DRAWING

The invention will be better understood and further objects and advantages thereof will become more apparent from the ensuing detailed description of a preferred embodiment, taken in conjunction with the drawings, in which.

DESCRIPTION OF THE PREFERRED EMBODIMENT

Figure 1:
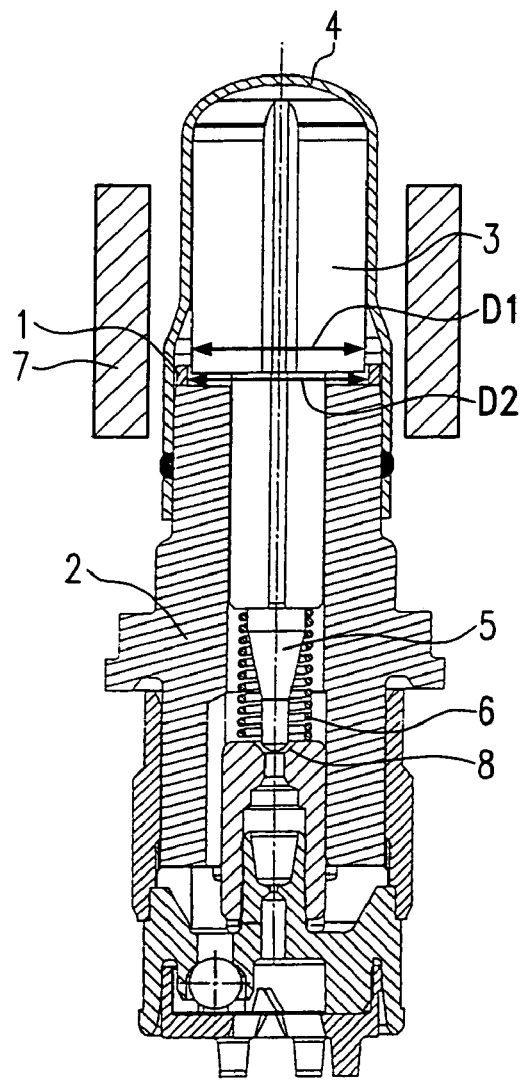
FIG. 1 is a schematic sectional view through an electromagnetic valve in one exemplary embodiment of the present invention.
Figure 2:
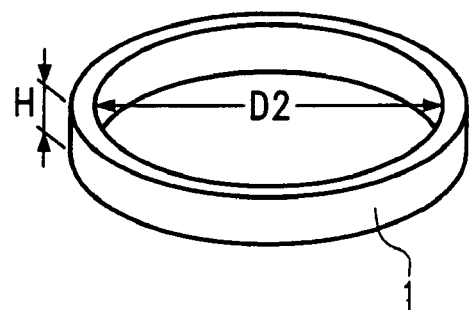
FIG. 2 is a schematic perspective view of the intermediate element used in FIG. 1.

FIG. 1 schematically shows an electromagnetic valve, which includes a valve insert 2 and an armature 3. The armature 3 is disposed in a cup-shaped, sleevelike housing component 4 solidly joined to the valve insert 2 by means of welding or other joining methods. The armature 3 is connected to an actuating element 5 and can be moved in a known manner, by supplying current or disrupting the supply of current to a magnet coil 7, in order to uncover or close an opening 8. A restoring spring 6 assures the restoration of the armature 3 and the actuating element 5, as applicable, to its outset position.

As FIG. 1 shows, between the armature 3 and the valve insert 2, which are disposed coaxially to one another, there is an intermediate element 1 in the form of a ring. The intermediate element 1 has an inner diameter D2 and a height H. The inner diameter D2 of the intermediate element 1 is greater than an outer diameter D1 of the armature 3. Moreover, the outer diameter of the intermediate element 1 is substantially equivalent to the outer diameter of the valve insert 2. As a result, the intermediate element 1 rests on the face end of the valve insert 2 toward the armature 3. Providing the intermediate element 1 makes it possible to achieve a plunging stage in the valve.

Upon assembly, the intermediate element 1, after the introduction of the armature into the housing 4, is likewise inserted into the housing 4. Next, the valve insert 2 is installed. To prevent the intermediate element 1 from being pulled over the armature 3 in the installation process, the housing 4 has a tapering region whose smallest inner diameter is smaller than the outer diameter of the intermediate element 1. An alternative possibility would be to provide a stop on the interior of the housing 4.

When current is now supplied to the valve, the intermediate element 1, made from a soft-magnetic material, is attracted to the valve insert 2 and sticks firmly to it. As a result, on the one hand, the requisite plunging stage for the armature 3 is attained, and on the other, the course of the characteristic lines of magnetic force is smoothed accordingly. In addition, the intermediate element 1 can also compensate for any deviations in concentricity that may exist between the armature guide and the valve insert.

The height H of the intermediate element 1 is moreover selected such that after assembly, the armature 3 cannot retract all the way out of the intermediate element 1 again. As a result, it can be assured with certainty that these two parts will not jam against one another.

By means of the use of the annular intermediate element, it is accordingly no longer necessary for the face ends oriented toward one another of the armature 3 and the valve insert 2 to be machined by means of fine machining, or to perform the metal-cutting lathe work that was previously necessary to embody a plunging stage. As a result, the valve of the invention can be produced markedly more simply and economically than the valves used until now in the prior art.

The valve described is especially preferably used in vehicle dynamics control systems, such as ESP systems or traction control systems or ABS systems.

The foregoing relates to a preferred exemplary embodiment of the invention, it being understood that other variants and embodiments thereof are possible within the spirit and scope of the invention, the latter being defined by the appended claims.

We claim:

1. A valve for controlling fluids, comprising
a housing (4),
an armature (3) for actuating an actuating element (5) disposed in the housing (4),
a valve insert (2) attached to the housing (4) and disposed coaxially to the armature (3) so that the armature (3) is movable with respect to the valve insert (2), and
an intermediate element (1) disposed between the armature (3) and the valve insert (2), the intermediate element (1) having an inner diameter (D2) which is greater than an outer diameter (D1) of one of the armature (3) or of the valve insert (2), and having an outer diameter which is equal to the outer diameter of the other of the armature (3) or the valve insert (2), wherein, once the armature (3), valve insert (2) and intermediate element (1) are assembled in the housing (4), the one of the armature (3) or the valve insert (2) which has the smaller outer diameter can slide within the space created by the inner diameter of the intermediate element (1).

2. The valve in accordance with claim 1, wherein the intermediate element (1) is an annular element.

3. The valve in accordance with claim 2, wherein the intermediate element (1) is embodied flexibly.

4. The valve in accordance with claim 2, wherein the intermediate element (1) is produced from a soft-magnetic material.

5. The valve in accordance with claim 4, wherein the intermediate element (1) is produced by means of stamping.

6. The valve in accordance claim 4, wherein the intermediate element (1) has a height (H) which is equal to or greater than a stroke height of the plunging stage of the valve.

7. The valve in accordance with claim 2, wherein the intermediate element (1) is produced by means of stamping.

8. The valve in accordance with claim 7, wherein the intermediate element (1) has a height (H) which is equal to or greater than a stroke height of the plunging stage of the valve.

9. The valve in accordance claim 2, wherein the intermediate element (1) has a height (H) which is equal to or greater than a stroke height of the plunging stage of the valve.

10. A vehicle dynamics control system incorporating a valve as disposed in claim 2.

11. A hydraulic or pneumatic system including a valve in accordance with claim 2.

12. The valve in accordance with claim 1, wherein the intermediate element (1) is embodied flexibly.

13. The valve in accordance with claim 12, wherein the intermediate element (1) is produced from a soft-magnetic material.

14. The valve in accordance with claim 12, wherein the intermediate element (1) is produced by means of stamping.

15. The valve in accordance claim 12, wherein the intermediate element (1) has a height (H) which is equal to or greater than a stroke height of the plunging stage of the valve.

16. The valve in accordance with claim 1, wherein the intermediate element (1) is produced from a soft-magnetic material.

17. The valve in accordance with claim 1, wherein the intermediate element (1) is produced by means of stamping.

18. The valve in accordance claim 1, wherein the intermediate element (1) has a height (H) which is equal to or greater than a stroke height of the plunging stage of the valve.

19. A vehicle dynamics control system incorporating a valve as disposed in claim 1.

20. A hydraulic or pneumatic system including a valve in accordance with claim 1.

* * * * *